No. 687,400. Patented Nov. 26, 1901.
M. H. MARCUS.
BOX SPRING BED.
(Application filed Oct. 27, 1900.)
(No Model.) 2 Sheets—Sheet 1.
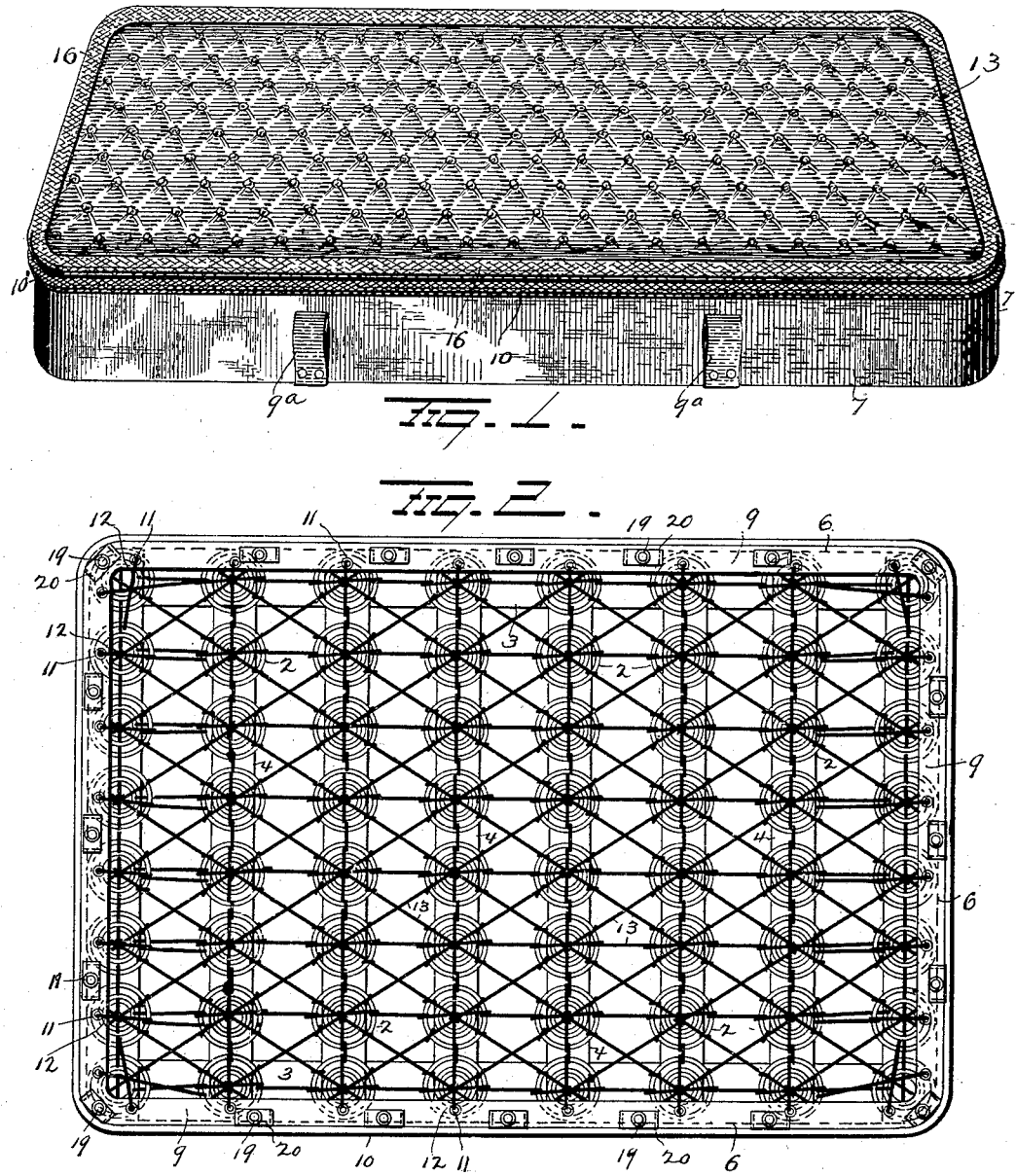
WITNESSES
E. D. Nottingham
G. F. Downing
INVENTOR
M. H. Marcus
By H. A. Seymour
Attorney
THE NORRIS PETERS CO., PHOTO-LITHO., WASHINGTON, D. C.

No. 687,400. Patented Nov. 26, 1901.
M. H. MARCUS.
BOX SPRING BED.
(Application filed Oct. 27, 1900.)
(No Model.) 2 Sheets—Sheet 2.
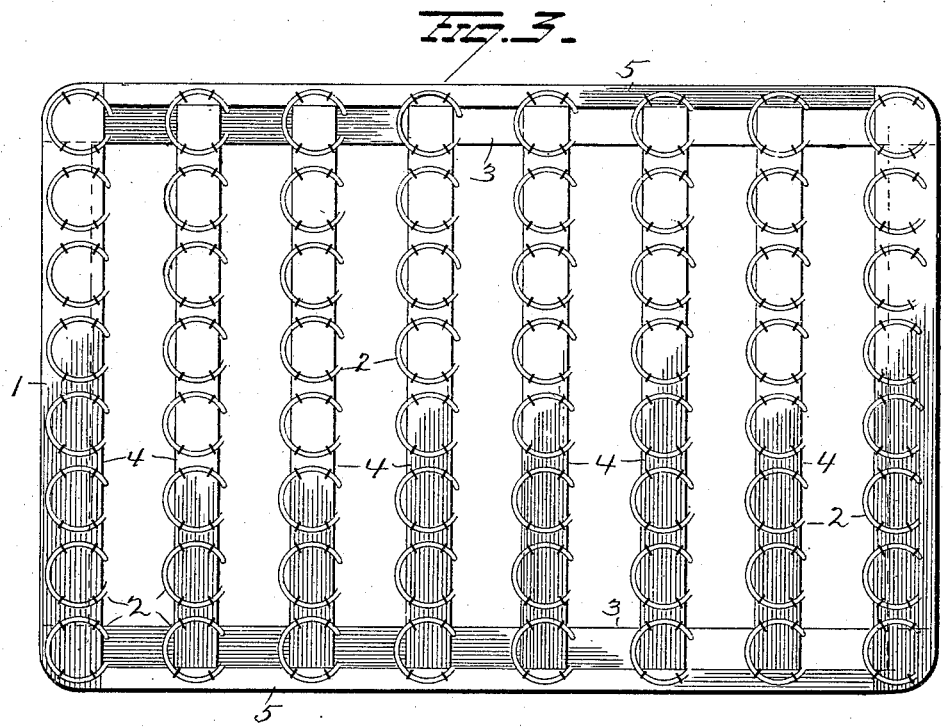
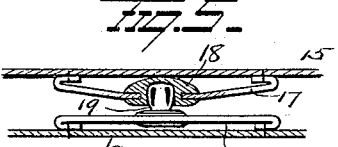
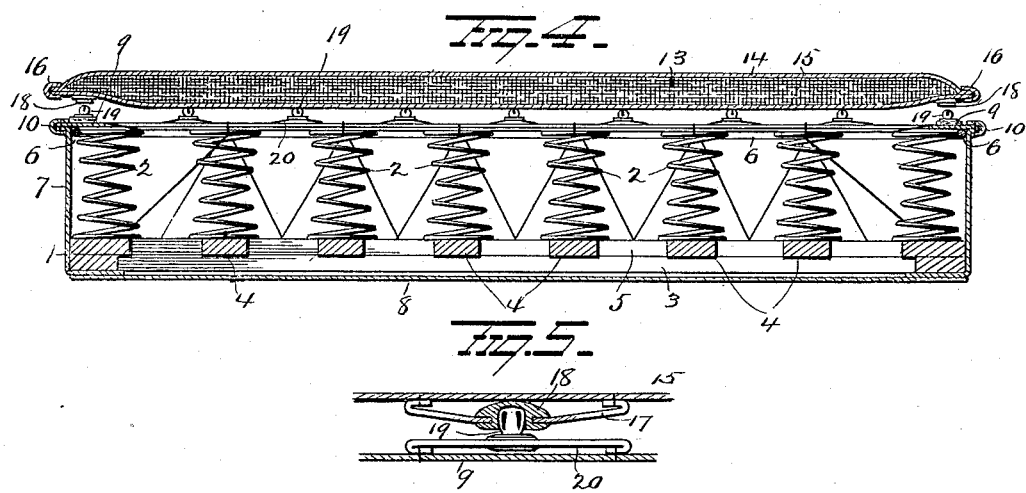
WITNESSES
E. S. Nottingham
G. F. Downing
INVENTOR
M. H. Marcus
By H. A. Seymour
Attorney

UNITED STATES PATENT OFFICE.

MARTIN H. MARCUS, OF NEW YORK, N. Y.

BOX SPRING-BED.

SPECIFICATION forming part of Letters Patent No. 687,400, dated November 26, 1901.

Application filed October 27, 1900. Serial No. 34,645. (No model.)

*To all whom it may concern:*

Be it known that I, MARTIN H. MARCUS, a resident of New York, in the county of New York and State of New York, have invented certain new and useful Improvements in Box Spring-Beds; and I do hereby declare the following to be a full, clear, and exact description of the invention, such as will enable others skilled in the art to which it appertains to make and use the same.

My invention relates to an improvement in box spring-beds, the object of the invention being to provide a device of this character in which the interior thereof is readily accessible for making repairs or for destroying insects or vermin which may find their way into the bed.

A further object is to provide a box spring-bed with a separate padded top and means for removably securing the top in place.

With these objects in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a view with the top removed. Fig. 3 is a view of the springs and supporting-platform with the entire covering removed, and Fig. 4 is a view in cross-section. Fig. 5 is an enlarged sectional view showing the detachable fastening device.

1 represents a support or platform, preferably of wood, for the springs 2, and comprises parallel side bars 3, spaced apart and connected by slats 4 and made with a narrow strip 5 at the ends of the intermediate slats to form a rest for one side of the side springs.
The springs 2 are secured on the slats in any desired formation, but preferably in alinement both longitudinally and transversely of the platform. A reed-frame 6 is secured around the upper outer edges of the outer springs by binding-twine, as shown, and alines with the outer edge of platform 1, both said platform and frame made with rounded or curved corners to give to the bed a neat and attractive appearance. A strip of ticking 7 is disposed around the sides and ends of the frame and platform and secured to the lower face of platform 1 by tacks, which latter are also passed through the bottom covering 8 and secure handholds or loops 9ª at the sides to facilitate moving the bed. The bottom, sides, and ends preferably comprise two thicknesses of material—an outer one of ticking, as above explained, and an inner covering of cheese-cloth to hide the seams and the reverse side of the ticking from view. To the upper edge of strip 7 an inwardly-projecting border 9 is sewed, the meeting seam inclosed by a tape 10, said border projecting over the outer springs and tucked at its corners to allow for the curve thereof. At the inner edge of border 9 I provide a series of eyelets 11, in which twine or other binding-cord 12 is secured to connect the border and springs, and the springs are connected to each other by cords 13 to brace them and to give to the entire top of the springs, or rather the entire upper surface of the body of the bed, a yielding and elastic network of threads, as the springs will normally hold the threads or cords taut and any downward pressure applied thereto will be compensated for by the springs.

The top 13 of the bed comprises a pad made up of a series of alternate layers of burlap and cotton-batting inclosed between an upper covering of ticking 14 and a lower covering of strong canvas 15, the meeting edges of the canvas and ticking sewed together and inclosed in a binding-tape 16, the contour or outline of the top 13 being the same as that of the body portion of the bed above described. A series of short strips or tape 17, each strip carrying one member 18 of a fastening device, are secured to the under face of top 13 and are adapted to engage the other members 19 of said fastening devices carried by similar short strips or tape 20, sewed at their ends to the border 9 to secure the top on the body portion. It will thus be seen that the top 13 can be readily removed from the body portion by simply forcing the fastening devices 18 and 19 apart, and the cords 12 can be untied to release border 9 and the sides and ends of the bed removed from the springs to repair any broken or damaged parts and to give complete access to all parts thereof for the purpose of removing any vermin or insect life which may find its way into the bed.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A bed comprising a body portion, having an inwardly-projecting flexible border at its upper edge, springs in said body portion, a pad disposed over the body portion and said border, two sets of flexible strips between the pad and said border, one set of strips secured to the pad and the other set secured to the border, male members of fastening devices secured to one set of strips and female members of said fastening devices secured to the other set of strips.

2. A bed comprising a body portion having an inwardly-projecting flexible border at its upper edge and constituting an extension of the sides and ends of the body portion, springs in the body portion, lacings connecting the flexible border and springs, a pad located over the springs and border and detachable fastening devices connecting the pad with said border.

3. In a box bed-spring, the combination with a platform, coiled springs secured on the platform and fabric covering the bottom of the platform, a fabric forming the sides and ends of the bed, a border projecting inwardly from the upper edge of the fabric forming the sides and ends, said border extending around the upper edge of the bed and projecting partially over the top of the outer springs and a padded top disposed upon the springs and border and means for removably connecting said padded top to the border.

4. The combination in a box spring-bed, of a platform, a series of springs mounted thereon, a frame secured to the upper ends of the springs, a strip of fabric extending around the series of springs and provided at its upper edge with a border projecting over and lying flat upon the outer springs of the series, cords connecting said border with the springs and a padded top upon the springs and removably secured upon the border.

5. In a box spring-bed, the combination with a platform, springs secured thereto, and a rigid frame secured to the upper edges of the outer springs, of a fabric constituting the ends and sides of the bed, a flexible border projecting inwardly from the upper edges of the fabric sides and ends and disposed over said rigid frame and partially over the tops of the outer springs, cords connecting the upper ends of the springs together and connecting the border to the springs, a padded top and means for removably connecting the padded top to the flexible border.

In testimony whereof I have signed this specification in the presence of two subscribing witnesses.

MARTIN H. MARCUS.

Witnesses:
J. C. LOWENBACH,
FRANK J. MULLINS.